Patented Nov. 29, 1949

2,489,317

UNITED STATES PATENT OFFICE 2,489,317

PREPARATION OF SULFONYL HALIDES

Wayne A. Proell, Chicago, Ill., assignor to Standard Oil Company, Chicago, Ill., a corporation of Indiana No Drawing. Application May 15, 1947, Serial No. 748,345

8 Claims. (Cl. 260—543)

This invention relates to a process for the preparation of a sulfonyl halide. More particularly it relates to a process for the conversion of the anhydride of a sulfonic acid to a sulfonyl halide.

Previously proposed processes for the preparation of organic sulfonyl halides have involved more or less costly and laborious processes. I have now found that a sulfonic anhydride as such, or present in a mixture with sulfonic acid can be converted smoothly and economically to the corresponding sulfonyl halides by reaction with a hydrogen halide or a metal halide.

The preparation of sulfonic anhydrides is described and claimed by me in application for Letters Patent S. N. 702,989, filed on October 12, 1946, of which the present application is a continuation-in-part. In the process described in S. N. 702,989 the anhydrides of organic sulfonic acids are produced by contacting a substantially anhydrous charging stock comprising an organic sulfur compound selected from the group consisting of disulfides, disulfoxides and disulfones with a small, catalytic proportion of a nitrogen oxide selected from the group consisting of NO, $NO_2$, $N_2O_3$, $N_2O_4$ and $N_2O_5$, at a temperature between about 0° C. and about 150° C. and at a pressure between about 5 and about 100 p. s. i. g., the charging stock being preferably maintained in the liquid phase. The process of S. N. 702,989 produces a mixture of sulfonic acid and the corresponding anhydride from which the pure sulfonic anhydrides can be isolated if desired.

The process of the present invention may be applied to anhydrides of aliphatic or aromatic sulfonic acids, particularly anhydrides of hydrocarbon sulfonic acids. The invention may also be applied to mixed anhydrides such as may be produced by applying the oxidation process of S. N. 702,989 to unsymmetrical organic disulfides, disulfoxides or disulfones, such, for example, as alkyl aryl disulfides, mixed alkyl disulfides, and the like.

Particularly, the process of the present invention may be applied to alkanesulfonic anhydrides, such as methane, ethane, propane, butane, pentane, n-dodecane, n-hexadecane sulfonic anhydrides; cycloalkanesulfonic anhydrides, such as cyclohexane, methylcyclohexane, ethylcyclopentane, dimethylcyclopentane sulfonic anhydrides and the like; aromatic sulfonic anhydrides such as phenyl, phenyl tolyl, phenyl xylyl, tolyl xylyl, phenyl naphthyl sulfonic anhydrides and the like. It should be understood that the specific examples of sulfonic anhydrides disclosed above are intended merely to illustrate the broad scope and applicability of the present invention.

In accordance with the invention a sulfonic anhydride, or mixtures containing the same (particularly mixtures of a sulfonic acid and the corresponding sulfonic anhydride) can be treated with a hydrogen halide to produce the corresponding sulfonyl halide, as indicated in the following equation:

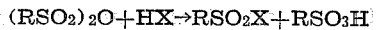

$$(RSO_2)_2O + HX \rightarrow RSO_2X + RSO_3H$$

wherein R represents an organic radical, particularly a hydrocarbon radical, and HX represents a hydrogen halide. In a suitable mode of operation the sulfonic anhydride is maintained in the liquid phase at a temperature between about 20° C. and about 130° C. and hydrogen halide vapor is passed into the liquid reaction mass; by the maintenance of suitable temperature and pressure conditions the sulfonyl halide may be distilled out as it is formed, particularly in the case of the relatively volatile sulfonyl halides such as the alkanesulfonyl halides having 1 to 5 carbon atoms, inclusive, in the alkyl group. Where it is desired to distill the sulfonyl halide from the reaction mixture, low pressures, e. g. between about 10 and about 760 mm. of mercury, may be maintained in the reaction zone.

Although the above procedure for reacting a hydrogen halide with a sulfonic anhydride is recommended, it is obvious that other methods of effecting contacting and reaction may be used. Reaction may be effected in bombs or autoclaves provided with agitating devices; in continuous reaction tubes through which the sulfonic anhydride is passed in the liquid state, hydrogen halide being preferably injected at various points along the length of the reaction tube; in reaction towers provided with suitable packing materials wherein hydrogen halide vapors may be absorbed by concurrent or countercurrent contacting with a sulfonic anhydride in the liquid state. If desired, inert solvents or dispersing agents may be employed with the sulfonic anhydrides to maintain them in the liquid phase and at the desired dilution.

Instead of employing a hydrogen halide for converting a sulfonic anhydride into an organic sulfonyl halide, I may employ metal halides, particularly alkali metal halides. Sodium chloride is an example of a suitable metal halide, although other metal halides such as calcium chloride, aluminum bromide, boron chloride, chromic chloride, stannic chloride and others may be employed. The reaction between a sulfonic anhydride and sodium chloride is illustrative and may be represented by the following equation:

$$(RSO_2)_2O + NaCl \rightarrow RSO_2Cl + RSO_3Na$$

It may be desirable to effect the reaction between a sulfonic anhydride and a metal halide in the presence of more or less free sulfonic acid. In the event that free sulfonic acid is present, it would appear that the reactions represented by the following equations occur, NaCl being employed therein merely as illustrative of the metal halides:

$$RSO_3H + NaCl \rightarrow RSO_3Na + HCl$$
$$(RSO_2)_2O + HCl \rightarrow RSO_3H + RSO_2Cl$$

It will be noted from the above equations that the sulfonic acid which enters into the reaction with the metal halide is regenerated, in effect, by the subsequent reaction of hydrogen chloride with sulfonic anhydride, so that only small amounts of the free sulfonic acid need be present initially. Moreover, where the sulfonic acid and sulfonic anhydride contain an identical R group, no complications in the product separation procedure results from the initial presence of the sulfonic acid.

The following is an example of one practical embodiment of my invention and is included for illustrative purposes. A mixture of 171 g. of n-butanesulfonic acid and n-butanesulfonic anhydride containing 80 weight per cent of the anhydride was warmed to about 65° C. and saturated with hydrogen chloride gas, whereupon 3 g. of hydrogen chloride were absorbed. After standing 30 minutes, the reaction mixture was again saturated with hydrogen chloride; this was repeated a third time, and the mixture was allowed to stand at room temperature for several weeks. At the end of this time the reaction mixture was examined and found to contain no free hydrogen chloride. Upon vacuum distillation of the reaction products, 27.0 cc. of pure n-butanesulfonyl chloride boiling at 73 to 75° C. under a pressure of 2 mm. of mercury were recovered in addition to 5 cc. of slightly impure n-butanesulfonyl chloride. Upon reacting 5 cc. of the pure n-butanesulfonyl chloride with p-toluidine about 5 g. of crystalline n-butanesulfonyl-p-toluide were obtained. The toluide melted at 56.5° C. and was characterized by its insolubility in water and solubility in alkali. Inasmuch as n-butanesulfonic acid will not react directly with p-toluidine to form a toluide, this is an indication that the product which was obtained is actually a sulfonyl chloride. The boiling point of n-butanesulfonyl chloride given by C. M. Suter, "The Organic Chemistry of Sulfur" (1944), page 102, Table IV as 96 to 97° C. under a pressure of 18 mm. of mercury, which agrees well with the value of 73–75° C. at 2 mm. of mercury which I obtained. The total yield of n-butanesulfonyl chloride produced in the above experiment is about 57 per cent of the theoretical.

Although my invention has been described with reference to particular embodiments thereof, these should not be construed as limitations of its broad scope.

I claim:

1. A process for the preparation of a saturated hydrocarbon sulfonyl chloride which comprises reacting the anhydride of a saturated hydrocarbon sulfonic acid with hydrogen chloride at a temperature between about 20° C. and about 130° C.

2. A process for the preparation of an alkanesulfonyl chloride which comprises reacting the anhydride of an alkanesulfonic acid with hydrogen chloride at a temperature between about 20° C. and about 130° C.

3. A process for the preparation of an alkanesulfonyl chloride which comprises reacting the anhydride of an alkane sulfonic acid with hydrogen chloride.

4. A process for the preparation of n-butanesulfonyl chloride which comprises reacting n-butanesulfonic anhydride with hydrogen chloride.

5. A process for the preparation of methanesulfonyl chloride which comprises reacting methanesulfonic anhydride with hydrogen chloride.

6. A process for the preparation of ethanesulfonyl chloride which comprises reacting ethanesulfonic anhydride with hydrogen chloride.

7. A process for the preparation of an alkanesulfonyl chloride containing 1 to 5 carbon atoms, inclusive, in the alkyl group, which process comprises reacting the anhydride of an alkanesulfonic acid containing 1 to 5 carbon atoms, inclusive, in the alkyl group in the liquid condition with hydrogen chloride at a temperature between about 20° C. and about 130° C. and distilling alkanesulfonyl chloride as formed from the reaction mixture.

8. A process for the preparation of an alkanesulfonyl chloride which comprises reacting a mixture comprising essentially an alkanesulfonic acid and the anhydride of said alkanesulfonic acid with hydrogen chloride at a temperature between about 20° C. and about 130° C.

WAYNE A. PROELL.

REFERENCES CITED

The following references are of record in the file of this patent:

Richter's Organic Chemistry, vol. 1, Nordeman Pub. Co. Inc., New York, N. Y., 3rd ed., 1944, page 318.

Fieser & Fieser, Organic Chemistry, Heath & Co., Boston, Mass., page 594, 1944.